United States Patent [19]
Koehn

[11] Patent Number: 5,732,818
[45] Date of Patent: Mar. 31, 1998

[54] COMPACT DISC PACKAGE

[75] Inventor: Annalee Koehn, Chicago, Ill.

[73] Assignee: R.R. Donnelley & Sons Company, Chicago, Ill.

[21] Appl. No.: 618,983

[22] Filed: Mar. 20, 1996

[51] Int. Cl.[6] ............................................. B65D 85/57
[52] U.S. Cl. ...................... 206/308.1; 206/312; 206/586
[58] Field of Search ............................. 206/308.1, 307, 206/308, 309, 311, 312, 313, 232, 492–495, 586; 229/72

[56] References Cited

U.S. PATENT DOCUMENTS

| | | |
|---|---|---|
| 2,175,338 | 10/1939 | Booth . |
| 3,072,519 | 1/1963 | Salzman . |
| 3,159,273 | 12/1964 | Schecterson et al. . |
| 3,594,976 | 7/1971 | Jackson . |
| 3,662,511 | 5/1972 | Eliasberg . |
| 4,268,261 | 5/1981 | Kohmann et al. . |
| 4,300,331 | 11/1981 | Yoshiba . |
| 4,304,328 | 12/1981 | Pilat . |
| 4,320,839 | 3/1982 | Skaggs . |
| 4,617,081 | 10/1986 | Bleau et al. . |
| 4,627,829 | 12/1986 | Brady, Jr. et al. . |
| 4,630,427 | 12/1986 | Harper et al. . |
| 4,667,819 | 5/1987 | Lu . |
| 4,709,812 | 12/1987 | Kosterka . |
| 4,733,519 | 3/1988 | Harper et al. . |
| 4,939,888 | 7/1990 | Katz et al. . |
| 5,076,432 | 12/1991 | Wolf et al. . |
| 5,085,318 | 2/1992 | Leverick . |
| 5,088,599 | 2/1992 | Mahler . |
| 5,101,973 | 4/1992 | Martinez . |
| 5,154,284 | 10/1992 | Starkey . |
| 5,186,327 | 2/1993 | McCafferty et al. . |
| 5,188,229 | 2/1993 | Bernstein . |
| 5,233,812 | 8/1993 | Coppola . |
| 5,242,049 | 9/1993 | Mizuno et al. . |
| 5,248,032 | 9/1993 | Sheu et al. . |
| 5,285,620 | 2/1994 | Kaye et al. . |
| 5,289,918 | 3/1994 | Dobias et al. . |
| 5,419,433 | 5/1995 | Harrer et al. . |
| 5,518,488 | 5/1996 | Schluger . |

Primary Examiner—Paul T. Sewell
Assistant Examiner—Luan K. Bui
Attorney, Agent, or Firm—Marshall, O'Toole, Gerstein, Murray & Borun

[57] ABSTRACT

A package for a compact disc having a rear panel and a front panel associated with the rear panel. The front and rear panels are substantially parallel to each other and have a space disposed between them in which an insert panel is disposed. The front panel has an aperture formed therein which is adapted to receive the compact disc. The insert panel has a central aperture formed therein which is adapted to accommodate the compact disc therein. The aperture formed in the front panel of the compact disc enclosure may be sized to expose at least a portion of the central hole of the compact disc when the compact disc is disposed in the central aperture of the insert panel. The aperture formed in the front panel may also include a finger slot which exposes a portion of a peripheral edge of the compact disc so that the compact disc can be grasped exclusively by its edges, thus eliminating the need to grasp either face of the disc.

12 Claims, 3 Drawing Sheets

COMPACT DISC PACKAGE

BACKGROUND OF THE INVENTION

The present invention is directed to a package adapted to store a compact disc.

Various types of packages are used or have been proposed to store compact discs. A conventional package for a compact disc is composed of a plastic case having a front panel and a rear panel which are hinged together and a plastic insert anchored to the rear panel. The plastic insert has an annular recess formed therein to accommodate a compact disc and a central retaining member which is adapted to be disposed within the central circular aperture of a compact disc to hold the disc in place within the plastic case. Such plastic compact disc cases are relatively expensive to manufacture, are easily scratched, and may be broken.

U.S. Pat. No. 5,085,318 to Leverick discloses a compact disc package formed of a single sheet of card stock which has three panels integrally connected together and separated by a pair of fold lines. One of the panels, which has a semicircular aperture formed therein to accommodate the insertion of a compact disc, is glued to another of the panels, and the third panel may act as a cover panel.

U.S. Pat. No. 5,101,973 to Martinez discloses a compact disc case, formed from a single sheet of cardboard, having a rear panel, a front panel integrally connected to the rear panel, and a cover panel integrally connected to the rear panel. The front panel has two side flaps which, when folded over and connected to the rear panel, help retain the compact disc between the front and rear panels. The front panel of the Martinez compact disc case also has a slot which is adapted to receive a tab on the cover panel to maintain the cover panel in a closed position.

One apparent disadvantage of the compact disc package disclosed in the Martinez patent is that, to remove the compact disc from the package, it would appear that a person would have to grasp portions of both faces of the compact disc, thereby contaminating the optically encoded surface of the compact disc. At column 3, lines 11–14, the Martinez patent states that "the interior walls of the pocket holding CD 30 can be provided with any desirable chemically treated materials for protecting the disc 30."

SUMMARY OF THE INVENTION

The invention is directed to a package for a compact disc having a rear panel and a front panel associated with the rear panel. The front and rear panels are substantially parallel to each other and have a space disposed between them in which an insert panel is disposed. The front panel has an aperture formed therein which is adapted to receive the compact disc. The insert panel has a central aperture formed therein which is adapted to accommodate the compact disc therein.

The aperture formed in the front panel of the compact disc enclosure may be sized to expose at least a portion of the central hole of the compact disc when the compact disc is disposed in the central aperture of the insert panel. The aperture formed in the front panel may also include a finger slot which exposes a portion of a peripheral edge of the compact disc so that the compact disc can be grasped exclusively by its edges, thus eliminating the need to grasp either face of the disc.

The compact disc enclosure may also have a cover panel connected to one of the front and rear panels, the cover panel being pivotable between a closed position in which the aperture formed in the front panel is covered by the cover panel and an open position in which the aperture formed in the front panel is not covered by the cover panel. The enclosure may also have closure means for maintaining the cover panel in the closed position, such as a tab formed on the cover panel and a slot formed in the front panel.

The compact disc enclosure may be supported within a box by a support structure having a main panel with an aperture sized to accommodate the compact disc enclosure and four support members. Each of the support members may be adapted to support a respective corner of the compact disc enclosure so that the compact disc enclosure is disposed between and spaced from the sides of the box.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
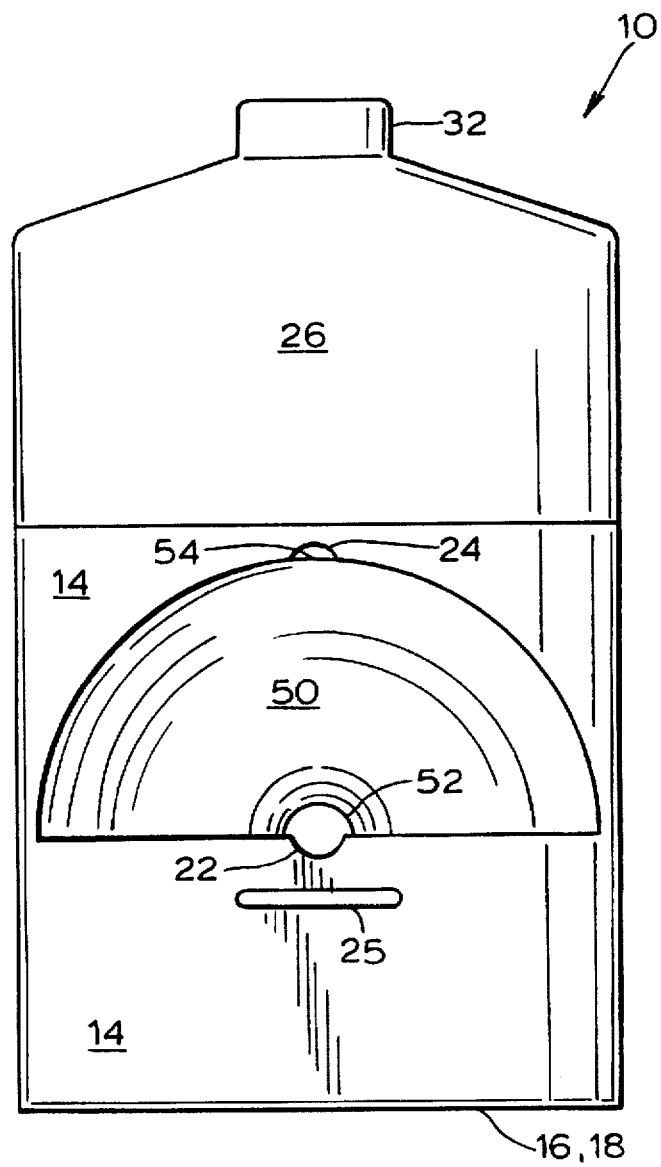
FIG. 1 illustrates an enclosure shown with a compact disc disposed therein.
Figure 2:
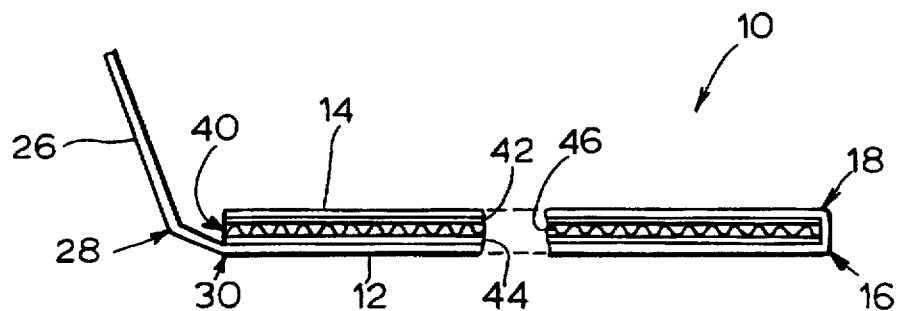
FIG. 2 is a side view of the enclosure of FIG. 1.
Figure 3:
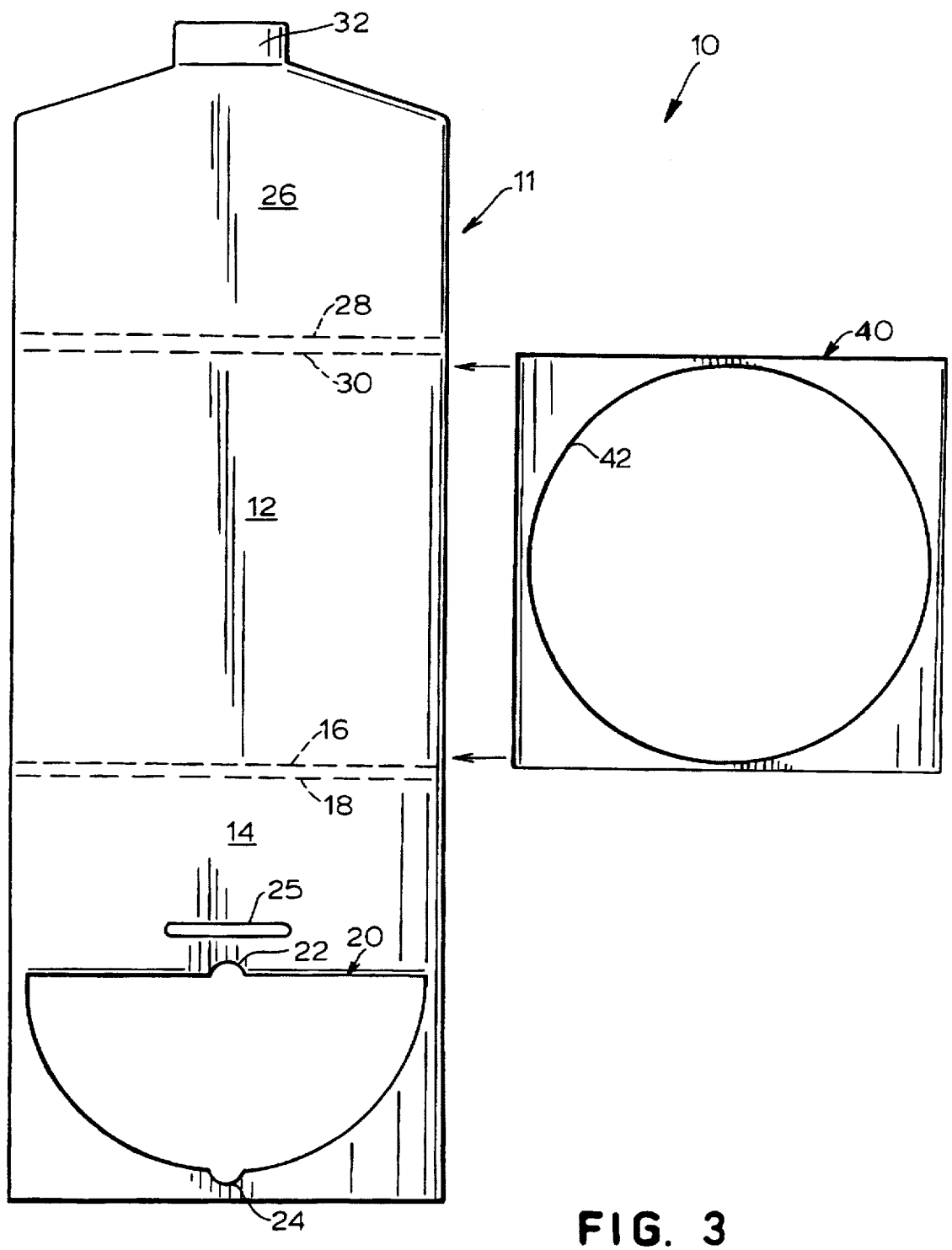
FIG. 3 illustrates a sheet from which the enclosure of FIG. 1 can be made and an insert panel which is disposed within the enclosure.

A preferred embodiment of an enclosure 10 for a compact disc is illustrated in FIGS. 1–3. As used herein, the term "compact disc" means a flat, circular object for storing data, including but not limited to compact discs on which music is recorded, optical discs, CD ROMs, etc.

A cardboard blank 11 from which the compact disc enclosure 10 may be formed is shown in FIG. 3, in which the dotted lines represent lines at which the blank 11 is to be folded. Referring to FIG. 3, the cardboard blank 11, which is a single sheet and which may be white to facilitate printing thereon, has a rear, substantially square panel 12 integrally connected to a front panel 14. The panels 12, 14 are separated by a pair of fold lines 16, 18 spaced relatively close together. The front panel 14 has a semicircular aperture 20 formed therein which is sized and adapted to receive a compact disc. The aperture 20 includes a centrally located, semicircular finger slot 22, a peripherally located, semicircular finger slot 24, and an elongate slot 25 formed therein.

The cardboard blank 11 has a cover panel 26 that is integrally connected to the rear panel 12 and separated from the rear panel 12 via a pair of fold lines 28, 30 spaced apart slightly more than the fold lines 16, 18. The cover panel 26 has a rectangular tab 32 which, when the blank 11 is folded along the fold lines 16, 18, 28, 30 to form the compact disc enclosure 10, may be inserted into the slot 25 to maintain the cover panel 26 in a closed position in which the panel 26 covers the aperture 20 formed in the front panel 14.

The compact disc enclosure 10 has a corrugated cardboard insert panel 40 having a circular aperture 42 with a diameter large enough to accommodate a compact disc. As shown in FIG. 2, which is a side view of the compact disc enclosure 10 when fully assembled, the insert panel 40 is composed of a pair of substantially planar paper or cardboard outer layers 42, 44 and a central corrugated layer 46 disposed between the two outer layers 42, 44.

To form the compact disc enclosure 10, the insert panel 40 is fixed to the top of the rear panel 12 of the cardboard blank 11, such as by gluing it to the rear panel 12. The front panel 14 is then folded along the fold lines 16, 18 so that the front panel 14 is disposed substantially parallel to the rear panel 12 and so that the front panel 14 covers the insert panel 40, and then the front panel 14 is fixed to the top of the insert panel 40, such as by gluing. The cover panel 26 is then folded along the fold lines 28, 30 so that it may pivot between a closed position in which it covers the aperture 20 formed in the front panel 14 and an open position in which is does not cover the aperture 20.

The compact disc enclosure 10 is illustrated in FIG. 1 in its assembled form along with a compact disc 50, which has a central circular aperture 52 formed therein, disposed within the circular aperture 42 of the insert panel 40 so that about half of the compact disc 50 is exposed through the semicircular aperture 20 formed in the front panel 14.

To remove the compact disc 50 from the enclosure 10, the compact disc 50 is grasped by two fingers at the finger slots 22, 24, with one finger making contact with the edge of the compact disc at its central hole 52 and the other finger making contact with an edge 54 of the compact disc 50 adjacent the finger slot 24. When so grasped, the compact disc 50 may be raised slightly relative to the plane of the front panel 14 and then removed through the aperture 20 in the front panel 14.

It should be noted that the finger slots 22, 24 facilitate insertion and removal of the compact disc 50 into and out of the enclosure 10 without the need to grasp either of the two faces of the compact disc 50 so that the face on which data is stored is not contaminated due to the transfer of oils and other substances from a person's fingers.

Referring to FIG. 2, the folds 16, 18 formed in the compact disc enclosure 10 are preferably spaced apart by a distance substantially equal to the thickness of the insert panel 40, and the folds 28, 30 are preferably spaced apart by a distance substantially equal to the combined thickness of the insert panel 40 and the front face 14. The thickness of the insert panel 40 is preferably at least as great as the thickness of the compact disc 50 for which the enclosure 10 is designed.

Instead of having the cover panel 26 hinged at the top portion of the rear panel 12, the cover panel 26 could be hinged at the left or right side portion of the rear panel 12. In that case, the cover panel could be made square and substantially equal in size to the front panel 14 so that the cover panel completely covered the front panel 14 when the cover panel was closed.

Figure 4:
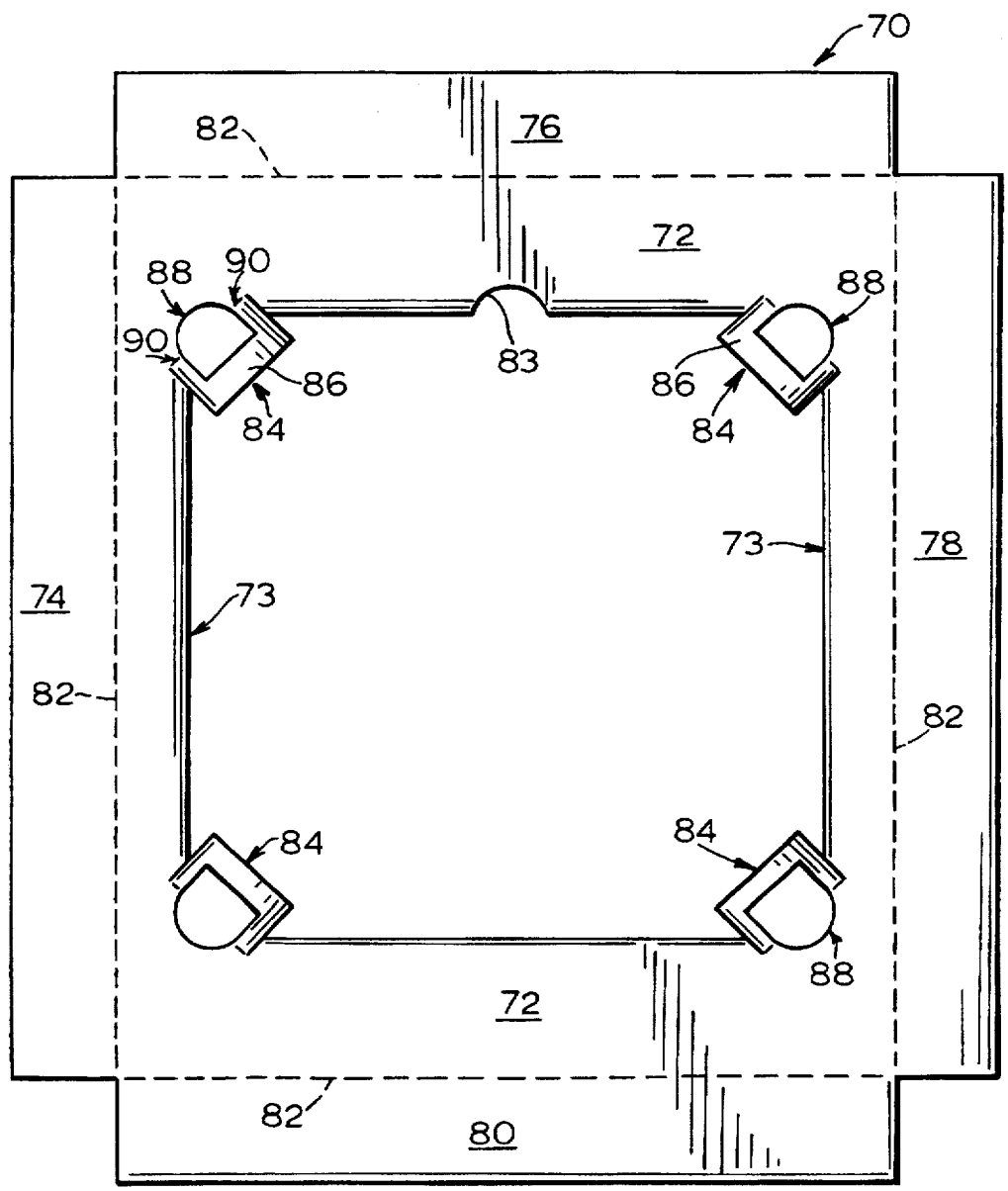
FIG. 4 illustrates a sheet from which a structure for supporting the compact disc enclosure can be made.
Figure 5:
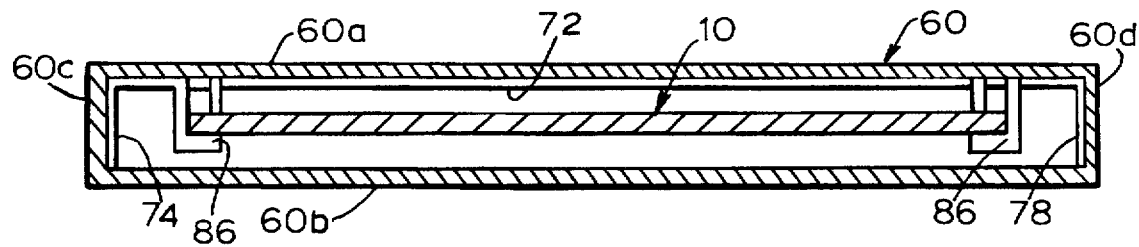
FIG. 5 is a cross-sectional side view of the compact disc enclosure of FIG. 1 supported by the structure of FIG. 4 within a box.

As shown in FIGS. 4 and 5, the compact disc enclosure 10 described above may be disposed within a cardboard box 60 via a support structure 70. Referring to FIG. 4, the support structure 70, which is formed of a single sheet of cardboard, has a rectangular main panel 72 having a generally square aperture 73 formed therein and four side panels 74, 76, 78, 80 which are separated from the main panel 72 via four fold lines 82. When folded along the fold lines 82, the four side panels 74, 76, 78, 80 are perpendicular to the main panel 72.

The aperture 73 is sized to be slightly larger than the outer dimensions of the compact disc enclosure 10 so that the enclosure 10 fits within the aperture 73. A finger slot 83 may be provided to facilitate insertion and removal of the compact disc enclosure 10 into and out of the support structure 70.

The main panel 72 has four support members 84, each of which is composed of a C-shaped portion 86 partly formed by an aperture 88. The two ends of each C-shaped portion 86 are folded downwardly at two short fold lines 90 so that the C-shaped portions 86 are perpendicular to the main panel 72. When so folded, each support member 84 may receive and support a respective corner of the compact disc enclosure 10 so that the enclosure 10 is supported within the box 60, as shown in FIG. 5, for shipping purposes, for example.

Referring to FIG. 5, the compact disc enclosure 10 is supported within the box 60 by the support structure 70. The box has four sides 60a, 60b, 60c, 60d, and the compact disc enclosure 10 (shown schematically in FIG. 5) is supported so that it is generally parallel to two of the sides 60a, 60b of the box and spaced from both of those sides 60a, 60b. As shown in FIG. 5, the height of the side panels 74, 78 is generally the same as the internal height of the box 60.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A package for a compact disc having a thickness, said compact disc package comprising:

a box having a pair of substantially parallel sides;

a compact disc enclosure adapted to receive and store said compact disc, said compact disc enclosure having four corners and comprising:

a rear panel;

a front panel integrally connected to said rear panel and separated from said rear panel by at least one fold, said front and rear panels being substantially parallel and having a space disposed therebetween, said front panel having an aperture formed therein, said aperture being adapted to receive said compact disc;

a cover panel integrally connected to said rear panel and being separated from said rear panel by at least one fold, said cover panel being pivotable between a closed position in which said aperture formed in said front panel is covered by said cover panel and an open position in which said aperture formed in said front panel is not covered by said cover panel; and a corrugated cardboard insert panel fixed in said space between said front and rear panels, said insert panel having a thickness of at least about said thickness of said compact disc, said insert panel having a central aperture adapted to accommodate said compact disc therein; and a support structure sized to fit within said box and adapted to support said compact disc enclosure, said support structure comprising:

a main panel having an aperture sized to accommodate said compact disc enclosure and four support members, each of said support members being adapted to support a respective one of said four corners of said compact disc enclosure so that said compact disc enclosure is disposed between said sides of said box and so that said compact disc enclosure is spaced from both of said sides of said box; and a plurality of side panels integrally formed with said main panel, each of said side panels being disposed perpendicularly to said main panel and being separated from said main panel via a fold.

2. The package defined in claim 1 wherein said support structure includes four rectangular side panels.

3. The package defined in claim 1 wherein said cover panel is separated from said rear panel by two folds.

4. The package defined in claim 1 wherein said central aperture of said corrugated cardboard insert panel has a substantially circular shape.

5. The package defined in claim 1 additionally comprising closure means for maintaining said cover panel in said closed position.

6. The package defined in claim 1 additionally comprising a slot formed in said front panel of said compact disc enclosure and a tab formed on said cover panel, said tab being insertable into said slot to maintain said cover panel in said closed position.

7. The package defined in claim 1 wherein said aperture formed in said front panel has a semicircular shape.

8. The package defined in claim 1 wherein said corrugated cardboard insert panel comprises a pair of substantially planar layers and a corrugated layer disposed between said substantially planar layers.

9. The package defined in claim 1 wherein said compact disc has a central hole and wherein said aperture formed in said front panel is sized to expose at least a portion of said central hole of said compact disc when said compact disc is disposed in said central aperture of said insert panel.

10. A package for a compact disc having a pair of planar faces, said package comprising:

a compact disc enclosure adapted to receive and store said compact disc, said compact disc enclosure comprising:
 a rear panel; and
 a front panel associated with said rear panel, said front and rear panels being substantially parallel and having a space disposed therebetween, said front panel having an aperture formed therein, said aperture being adapted to receive said compact disc; and means for supporting said compact disc enclosure within a box so that said rear panel and said front panel of said compact disc enclosure are spaced from a pair of sides of said box which are parallel to said front and rear panels.

11. The package defined in claim 10 additionally comprising insert panel means fixed in said space between said front and rear panels, said insert panel means having a central aperture adapted to accommodate said compact disc therein, wherein said compact disc has a central hole and wherein said aperture formed in said front panel is sized to expose at least a portion of said central hole of said compact disc when said compact disc is disposed in said central aperture of said insert panel means.

12. The package defined in claim 10, wherein said aperture formed in said front panel additionally includes a finger slot which exposes a portion of a peripheral edge of said compact disc.

* * * * *